US012703566B2

(12) United States Patent
Fraas et al.

(10) Patent No.: US 12,703,566 B2
(45) Date of Patent: Aug. 11, 2026

(54) REAR LOADING REFUSE VEHICLE

(71) Applicant: The Heil Co., Chattanooga, TN (US)

(72) Inventors: Mark Fraas, Centre, AL (US); Evan Tyler Whitten, Rainbow City, AL (US); Michael Shane Peek, Pisgah, AL (US)

(73) Assignee: The Heil Co., Chattanooga, TN (US)

( * ) Notice: Subject to any disclaimer, the term of this patent is extended or adjusted under 35 U.S.C. 154(b) by 578 days.

(21) Appl. No.: 18/169,535

(22) Filed: Feb. 15, 2023

(65) Prior Publication Data

US 2023/0312240 A1 Oct. 5, 2023

Related U.S. Application Data

(60) Provisional application No. 63/324,707, filed on Mar. 29, 2022.

(51) Int. Cl.
*B65F 3/04* (2006.01)
*B65F 3/08* (2006.01)
(Continued)

(52) U.S. Cl.
CPC ................ *B65F 3/041* (2013.01); *B65F 3/08* (2013.01); *B65F 3/201* (2013.01); *B65F 3/207* (2013.01); *B65F 3/28* (2013.01)

(58) Field of Classification Search
CPC .. B65F 3/041; B65F 3/08; B65F 3/201; B65F 3/207; B65F 3/28
See application file for complete search history.

(56) References Cited

U.S. PATENT DOCUMENTS 1,458,240 A * 6/1923 Otterson ................... B65F 3/08 414/373
1,945,533 A * 2/1934 Lima ......................... B65F 3/08 414/501

(Continued)

FOREIGN PATENT DOCUMENTS

FR 2511660 A1 * 2/1983 ................ B65F 3/08
GB 2191461 A * 12/1987 ................ B65F 3/08

(Continued)

OTHER PUBLICATIONS

Twitter.com [online], "Photo 3," Mar. 21, 2022, retrieved on Mar. 16, 2023, retrieved from URL <https://twitter.com/FAUN Zoeller/status/1505851730583597061?cxt=HHwWisC93fWK7uUpAAAA>, 2 pages.

(Continued)

*Primary Examiner* — James Keenan
(74) *Attorney, Agent, or Firm* — Fish & Richardson P.C.

(57) ABSTRACT

A refuse vehicle body includes a hopper configured to receive refuse and a storage container configured to store compacted refuse. A tailgate is coupled to a rearward facing side of the refuse vehicle body and is movable between closed and opened positions. The refuse vehicle body includes a rear loading assembly configured to (i) engage a refuse container at a rear side of the refuse vehicle body, (ii) lift the refuse container over a top end of the tailgate, and (iii) rotate the refuse container above the hopper such that the refuse container is unloaded into the hopper. The refuse vehicle body further includes a refuse packing assembly configured to transfer refuse from the hopper and compact said refuse in the storage container.

20 Claims, 10 Drawing Sheets

(51) Int. Cl.
*B65F 3/20* (2006.01)
*B65F 3/28* (2006.01)

(56) References Cited

U.S. PATENT DOCUMENTS

| | | | | | |
|---|---|---|---|---|---|
| 2,084,656 | A | * | 6/1937 | Rottee | B65F 3/18 414/525.6 |
| 2,256,042 | A | * | 9/1941 | Boone | B60P 1/48 414/598 |
| 2,271,444 | A | * | 1/1942 | Schutz et al. | B65F 3/08 414/487 |
| 2,699,268 | A | * | 1/1955 | Miller | B65F 3/08 414/487 |
| 2,750,056 | A | * | 6/1956 | Dow | B60P 1/26 414/501 |
| 2,832,488 | A | * | 4/1958 | Kamin | B65F 3/04 414/501 |
| 3,113,685 | A | * | 12/1963 | Miller | B65F 3/04 414/812 |
| 3,857,503 | A | * | 12/1974 | Brown | B65F 3/041 414/420 |
| 4,548,542 | A | * | 10/1985 | Reese | B65F 3/04 414/549 |
| 5,059,081 | A | * | 10/1991 | Brown | B65F 3/041 414/408 |
| 10,053,285 | B2 | * | 8/2018 | Brown | B65F 3/041 |
| 2020/0346855 | A1 | | 11/2020 | Rocholl et al. | |
| 2020/0346861 | A1 | * | 11/2020 | Rocholl | B65F 3/14 |
| 2020/0346862 | A1 | * | 11/2020 | Rocholl | B65F 3/203 |
| 2020/0347659 | A1 | | 11/2020 | Rocholl et al. | |

FOREIGN PATENT DOCUMENTS

| | | | | | |
|---|---|---|---|---|---|
| GB | 2232952 | A | * | 1/1991 | B65F 3/08 |
| GB | 2269357 | A | * | 2/1994 | B65F 3/08 |

OTHER PUBLICATIONS

[No Author Listed] [online], "Heil Collectomatic," Jun. 23, 2012, retrieved on Nov. 5, 2025, retrieved from URL <https://www.youtube.com/watch?v=cRxYdhWzxh0>, 22 pages.

[No Author Listed] [online], "Heil Powerlift," Mar. 2, 2007, retrieved on Nov. 5, 2025, retrieved from URL <https://www.youtube.com/watch?v=8ARKwfWNzwM>, 10 pages.

[No Author Listed] [online], "Scorpion Refuse Packer Demonstration," Oct. 6, 2011, retrieved on Nov. 5, 2025, retrieved from URL <https://www.youtube.com/watch?v=pTF282a5ZIM>, 421 pages, [English audio translation].

* cited by examiner

REAR LOADING REFUSE VEHICLE

CROSS REFERENCE TO RELATED APPLICATIONS

This application claims the benefit under 35 U.S.C. § 119(e) of U.S. Patent Application No. 63/324,707, entitled "Rear Loading Refuse Vehicle," filed Mar. 29, 2022, which is incorporated herein by reference in its entirety.

FIELD OF THE INVENTION

Disclosed embodiments relate generally to refuse collection vehicles and more particularly to a rear loading refuse vehicle.

BACKGROUND INFORMATION

Refuse vehicles have long serviced homes and businesses in urban, residential, and rural areas. Collected waste is commonly transported to a landfill, an incinerator, a recycling plant, or some other facility. After collection in a hopper, the waste is generally compacted into a storage chamber in the body of the vehicle. Such compaction reduces the volume of the refuse and increases the carrying capacity of the vehicle.

While refuse vehicles have long been serviceable, there is a need for further improvements. For example, there is considerable active interest in the development of electrically powered refuse vehicles. Such vehicles pose considerable development challenges including, for example, power management challenges, load capacity and load distribution challenges, vehicle maneuverability challenges, and refuse loading, packing, and ejecting challenges. There remains a need in the industry for improved refuse vehicle configurations, particularly for electric refuse vehicles.

SUMMARY

A refuse vehicle body includes a hopper configured to receive refuse and a storage container configured to store compacted refuse. A tailgate is coupled to a rearward facing side of the body and is movable between closed and opened positions. A rear loading assembly is configured to (i) engage a refuse container at a rear side of the vehicle body, (ii) lift the refuse container over a top end of the tailgate, and (iii) rotate the refuse container above the hopper such that the refuse container is unloaded into the hopper. A refuse packing assembly is configured to transfer refuse from the hopper and compact said refuse in the storage container.

One aspect of the present disclosure features a refuse vehicle including: a vehicle chassis; a refuse vehicle body on the vehicle chassis, the refuse vehicle body including a hopper configured to receive refuse and a storage container configured to store compacted refuse; a tailgate coupled to a rearward facing side of the refuse vehicle body, the tailgate movable between a closed position and an open position; a refuse packing assembly in the refuse vehicle body and configured to transfer refuse from the hopper and compact said refuse in the storage container; and a rear loading assembly on the refuse vehicle body, the rear loading assembly configured to (i) engage a refuse container at a rear side of the refuse vehicle body and (ii) lift and rotate the refuse container over the hopper such that the refuse container is unloaded into the hopper, wherein the rear loading assembly is configured to lift the refuse container over a top end of the tailgate.

In some embodiments, the rear loading assembly includes: first and second lift arms pivotably connected to corresponding first and second opposing lateral sides of the refuse vehicle body; and first and second lift arm actuators configured to rotate the first and second lift arms with respect to the refuse vehicle body between a lower container engagement position and an upper container dump position.

In some embodiments, the rear loading assembly further includes: a pair of forks rotationally coupled to the first and second lift arms; and at least one fork actuator configured to rotate the pair of forks with respect to the first and second lift arms between a fork engagement position and a dump position.

In some embodiments, the hopper is located at a front end of the refuse vehicle body and the storage container is located at a rear end of the refuse vehicle body.

In some embodiments, the refuse packing assembly includes an ejector configured to translate between an extended position at the rear end of the refuse vehicle body and a retracted position at the front end of the refuse vehicle body.

In some embodiments, the ejector is configured to both pack and eject refuse in a rearward direction in the refuse vehicle body.

In some embodiments, the rear loading assembly is deployed on an external side of the tailgate and moves with the tailgate between the opened position and the closed position.

In some embodiments, the rear loading assembly includes at least first and second rails on the tailgate, the first and second rails configured to guide a container engagement assembly and an engaged refuse container over the top end of the tailgate.

In some embodiments, the container engagement assembly is configured to rotate with respect to the first and second rails between container an engagement position and a dump position.

In some embodiments, the rear loading assembly includes: first and second guide rails on opposing lateral sides of the refuse vehicle body; a fork assembly including a pair of forks configured to engage a refuse container and at least one fork actuator configured to rotate the pair of forks with respect to the first and second guide rails between a fork engagement position and a dump position; and the fork assembly deployed on the first and second guide rails and configured to translate along the first and second guide rails between a lower container engagement position and an upper dump position.

In some embodiments, the fork assembly is coupled to a rotary drive which is in turn coupled with the first and second guide rails, the rotary drive including an electrical motor configured to rotate first and second engagement hubs to translate the fork assembly along the corresponding first and second guide rails.

In some embodiments, each of the first and second guide rails includes a curved upper section subtending an angle of greater than 135 degrees.

In some embodiments, the hopper is located at a rear end of the refuse vehicle body and the storage container is located at a front end of the refuse vehicle body.

In some embodiments, the refuse packing assembly includes a packer panel that is configured to clear the hopper and pack refuse in the storage container in a forward direction in the refuse vehicle body.

In some embodiments, the refuse vehicle further includes an ejector assembly configured to eject refuse from the refuse vehicle body in a rearward direction when the tailgate is in the opened position, the ejector assembly being distinct from the refuse packing assembly.

In some embodiments, the refuse packing assembly is configured to retract into the tailgate.

In some embodiments, the refuse packing assembly is further configured to move with the tailgate as the tailgate moves between the opened and closed positions.

In some embodiments, the refuse packing assembly further includes a rack retained in engagement with a pinion, a first end of the rack being rotationally coupled with the tailgate, a second end of the rack being received in a sleeve, the sleeve being rotationally coupled with the packer panel, wherein rotation of the pinion causes the packer panel to extend and retract out of and into the tailgate.

In some embodiments, the refuse vehicle further includes an electric motor coupled to the sleeve and configured to drive the pinion.

In some embodiments, the refuse packing assembly includes at least first and second linear actuators rotationally coupled with a packer panel; and the packer panel is configured to be rotated to a horizontal orientation that is adjacent to the tailgate when the tailgate is in the opened position.

In some embodiments, the packer panel is configured to be rotated to the horizontal orientation by at least partially retracting the first linear actuator and at least partially extending the second linear actuator.

In some embodiments, an ejector panel is sized and shaped to translate below the packer panel when the ejector panel is in an extended position, and the packer panel is in the horizontal orientation.

In some embodiments, the tailgate is configured to rotate about a pivot axis between the closed position and the open position; and the rear loading assembly is configured to lift the refuse container over the pivot axis.

This summary is provided to introduce a selection of concepts that are further described below in the detailed description. This summary is not intended to identify key or essential features of the claimed subject matter, nor is it intended to be used as an aid in limiting the scope of the claimed subject matter. Other features, objects, and advantages of the invention will be apparent from the description and drawings, and from the claims.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1A:
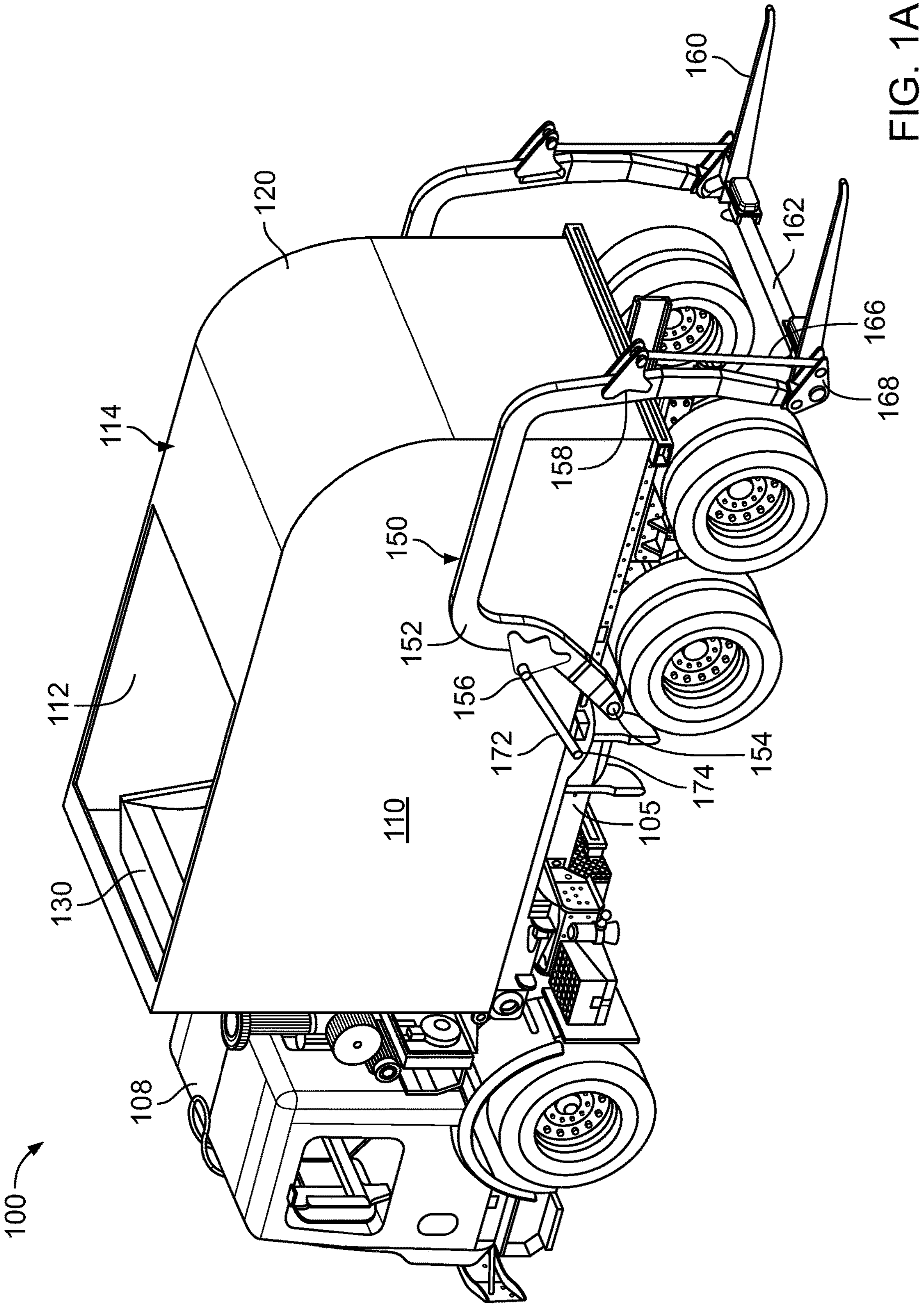
FIGS. 1A and 1B (collectively FIG. 1) depict an example refuse vehicle employing one disclosed rear loading assembly.

Rear loading refuse vehicles are disclosed. The disclosed vehicles include a vehicle chassis and a refuse vehicle body on the chassis. The body includes a hopper configured to receive refuse and a storage container configured to store compacted refuse. A tailgate is coupled to a rearward facing side of the body and is movable between closed and opened positions. A rear loading assembly is configured to (i) engage a refuse container at a rear side of the vehicle body, (ii) lift the refuse container over a top end of the tailgate, and (iii) rotate the refuse container above the hopper such that the refuse container is unloaded into the hopper. A refuse packing assembly is configured to transfer refuse from the hopper and compact said refuse in the storage container.

In certain embodiments, the rear loading assembly may include first and second lift arms rotatably coupled to corresponding first and second opposing lateral sides of the vehicle body. First and second lift arm actuators are configured to rotate the lift arms with respect to the vehicle body between a lower container engagement position and an upper container dump position. A pair of forks may be rotatably coupled to the lift arms and configured to rotate between fork engagement and dump positions via one or more additional actuators. In such vehicle embodiments, the hopper may be located at the front of the vehicle body and the vehicle may include an ejector panel configured to clear the hopper and compact refuse into a storage container at the rear of the vehicle body. The ejector may also be configured to eject the refuse when the tailgate is opened.

In certain other embodiments the rear loading assembly may be deployed on an external surface of the tailgate and may move with the tailgate as it is opened and closed. In other embodiments the rear loading assembly may be deployed on a back side of the vehicle body. In these embodiments, the rear loading assembly may be configured to lift a refuse container over a top end of the tailgate (e.g., over a pivot axis of the tailgate) and load the refuse into a hopper located at the rear of the vehicle body. A refuse packing assembly may be configured to extend towards the front of the vehicle body in order to clear the hopper and compact refuse in a storage container located at a front end of the vehicle body. Such embodiments may include distinct refuse packing and refuse ejecting assemblies with the ejecting assembly configured to eject refuse out the rear of the vehicle body when the tailgate is opened.

For example, in one embodiment the refuse packing assembly may be configured to retract into the tailgate and move with the tailgate as it is opened and closed. In such embodiments, retracting the refuse packing assembly and opening the tailgate moves the refuse packing assembly so that it doesn't obstruct extension of the ejector assembly. In another embodiment, the refuse packing assembly may be configured to rotate into a substantially horizontal orientation adjacent to the opened tailgate and the roof of the vehicle body so that it does not obstruct extension of the ejector assembly.

The disclosed embodiments may advantageously provide a rear loading refuse vehicle and/or refuse vehicle body. Such embodiments may advantageously provide for improved vehicle maneuverability and improved access to refuse containers maintained in tight spaces (e.g., in alleys and other restricted access ways). Moreover, such vehicle embodiments may have a more even weight distribution over the front and rear axles which may enable the vehicle to carry larger loads (particularly in electric vehicle or electric vehicle body embodiments). Moreover, the disclosed embodiments may provide for improved operator safety in that the refuse is not loaded over the vehicle cab as in a conventional front loader.

Figure 1B:
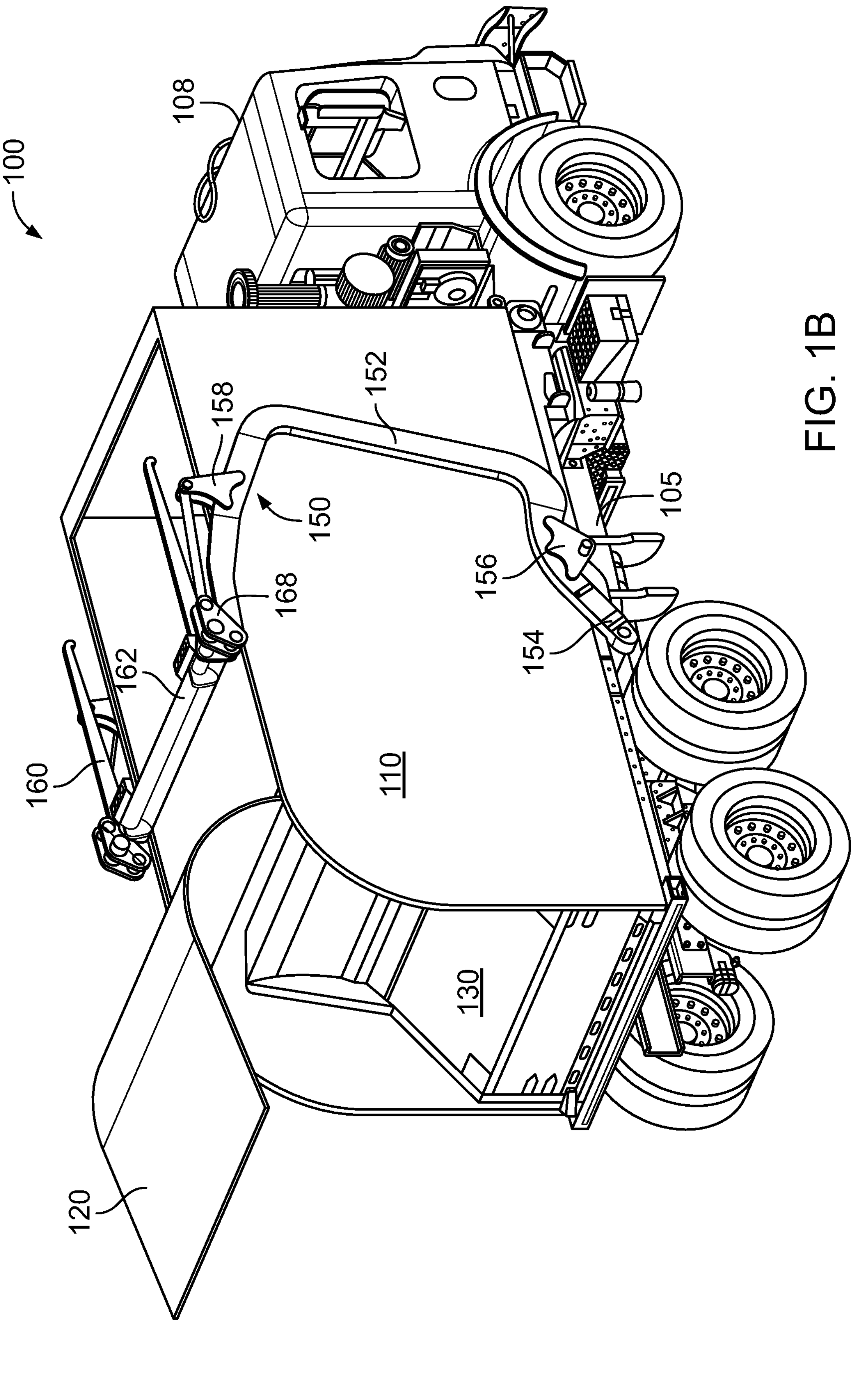

FIGS. 1A and 1B (collectively FIG. 1) depict a perspective view of an example rear loading refuse vehicle 100. The depicted vehicle 100 includes a vehicle body 110 and a cab 108 deployed on a chassis (or frame) 105. The vehicle body 110 includes (or houses) a refuse container configured to receive and store compacted refuse for transfer. In the depicted embodiment the body 110 includes a hopper 112 located in a front portion of the body 110 and a storage container 114 located behind (rearward from) the hopper 112. An upper end (or face) of the hopper 112 may be open (as depicted) and configured to receive refuse from above the vehicle.

Vehicle body 110 further includes a rear loading assembly 150 configured to load refuse into the hopper 112 from the rear of the vehicle 100. It will be appreciated that the rear loading assembly 150 is configured to load the refuse up and over the tailgate 120 (rather than up and over the cab as in a conventional front loader). As noted above such loading may improve the safety of the loading operation as the refuse is no longer loaded over the cab and the vehicle operator. In the depicted embodiment, the rear loading assembly 150 includes first and second lift arms 152 deployed on laterally opposing sides of the body 110. The arms 152 are rotationally coupled (e.g., pinned) to the body 110 (or frame 105) as depicted at 154. The rear loading assembly 150 includes first and second lift arm actuators 172 (one on each side of the body in the depicted embodiment) configured to rotate the lift arms 152 between a first lower container engagement position (FIG. 1A) and a second upper dump position (FIG. 1B). The lift arm actuators 172 extend between actuator interfaces 174 on the body 110 and lift arm brackets 156 on the lift arms 152.

Figure 2A:
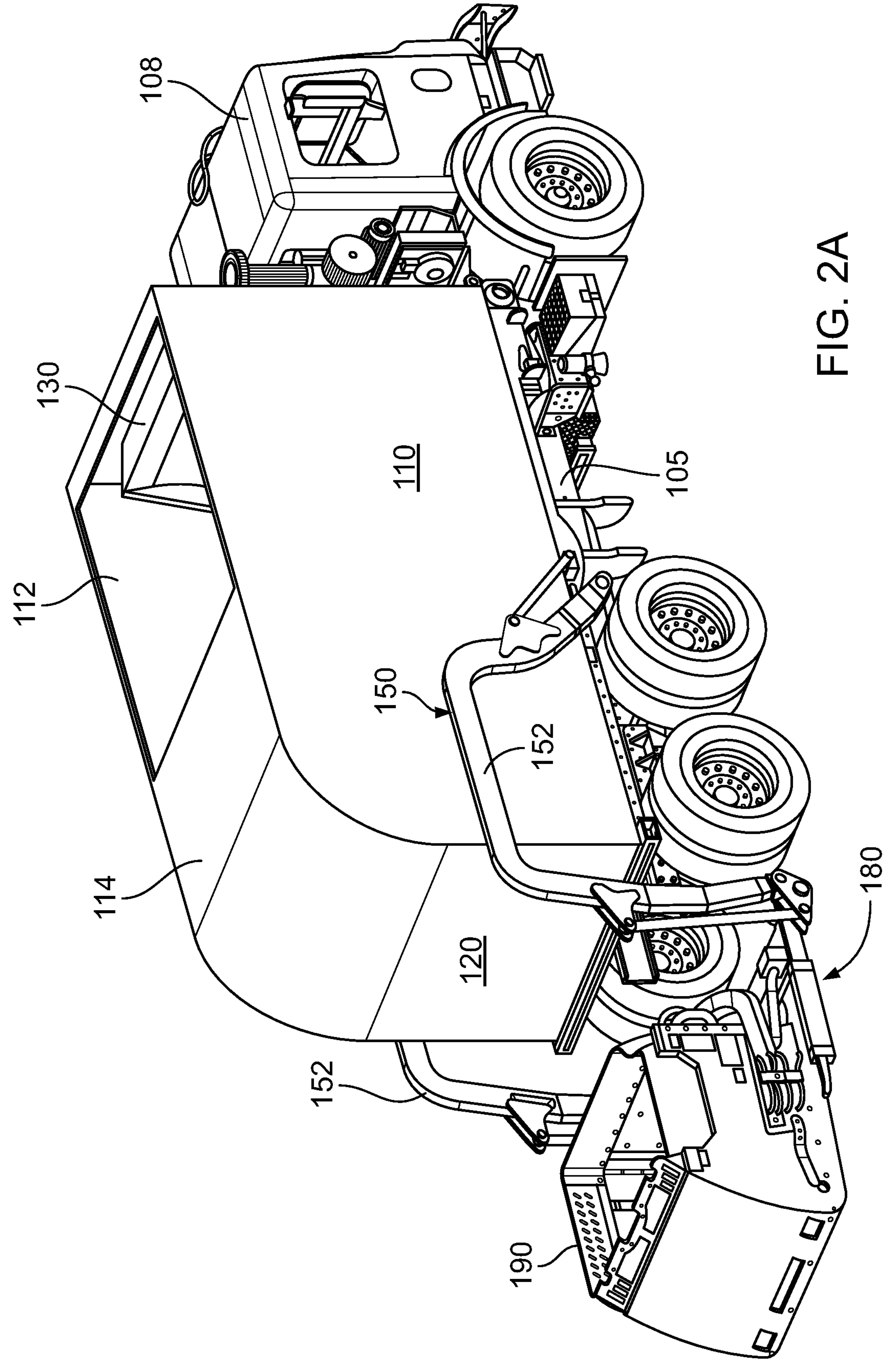
FIGS. 2A and 2B (collectively FIG. 2) depict the vehicle of FIG. 1 further including a carry can deployed on the rear loading assembly.
Figure 2B:
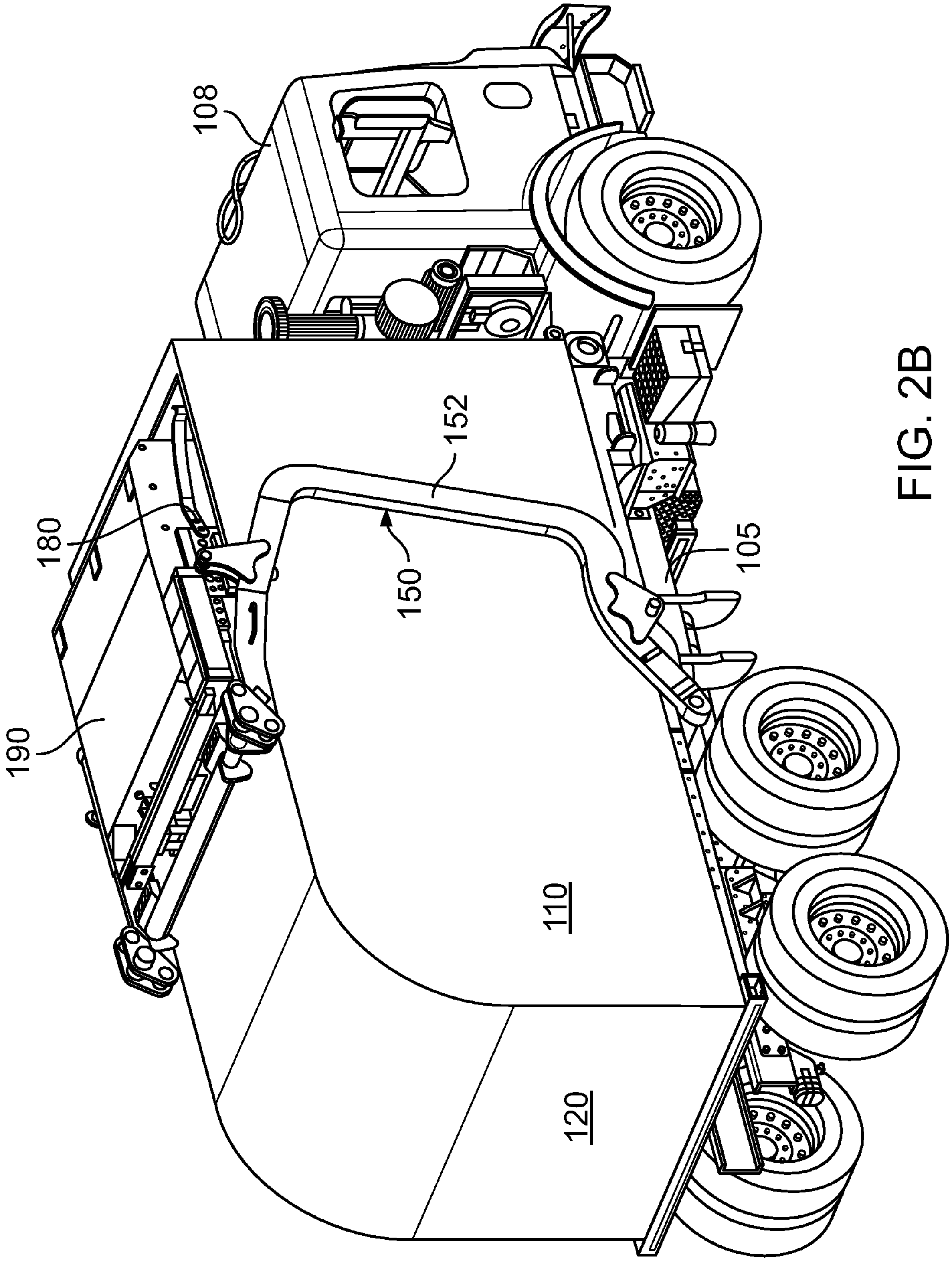

In the depicted embodiment, the rear loading assembly further includes a pair of forks 160 rotationally coupled to the lift arms 152 (e.g., via shaft 162 which is rotationally coupled to and connects the lift arms 152). The forks 160 may be sized and shaped, for example, to engage any suitable container such as a dumpster or a carry can 190 (FIGS. 2A and 2B). First and second fork actuators 166 (one on each side of the assembly) are configured to rotate the shaft 162 (and the forks 160) between container engagement (FIG. 1A) and dump (FIG. 1B) positions. The fork actuators 166 may extend between shaft brackets 168 that are rotationally coupled with the shaft 162 and fork brackets 158 on the lift arm 152.

The lift arm actuators 172 and the fork actuators 166 may include substantially any suitable actuators, for example, including hydraulic actuators (e.g., pistons) driven by a mechanical or electrical pump and electrically powered actuators powered via an electrical power source such as a battery or alternator. Electrically power actuators may be preferred in certain embodiments and may include a linear actuator such as a ball screw or a lead screw driven by an electric motor. It will be appreciated that the disclosed embodiments are not limited to any particular lift arm actuator and for actuator configuration.

With continued reference to FIGS. 1A and 1B, extension of the lift arm actuators 172 and the fork actuators 166 rotates the lift arms 152 and forks 160 to the engagement position (FIG. 1A) at which the rear loading assembly 150 is configured to engage a refuse container such as a dumpster or a carry can 190 (FIG. 2A). Upon engagement with the container (not shown in FIGS. 1A and 1B), the lift arm actuators 172 and the fork actuators 166 may be retracted to lift the container to the dump (or refuse loading) position (FIGS. 1B and 2B) at which the refuse may be dumped (unloaded from the container or carry can) into the hopper 112.

With continued reference to FIGS. 1A and 1B, the vehicle body further includes a tailgate 120 deployed on a rearward facing end of the body 110. The tailgate 120 is configured to open and close the storage container 114 to the outside world. For example, the tailgate 120 may be pinned or hinged (not shown) at or near a top end of the body such that the tailgate 120 may rotate about the hinge (or pivot axis) between the closed and open positions. The tailgate 120 is shown in the closed position in FIGS. 1A and 1*n* the open position in FIG. 1B. In certain embodiments the tailgate 120 may be rotationally fixed to a shaft via tailgate brackets. For example, the tailgate brackets may be welded and/or bolted to both the tailgate 120 and the shaft (which is in turn configured to rotate with respect to the body). The disclosed embodiments are, of course, not limited to any particular open and close configuration or actuation mechanism.

As further depicted on FIGS. 1A and 1B, vehicle body 110 further includes an ejector 130 configured to translate between forward (retracted) (FIG. 1A) and rearward (extended) (FIG. 1B) positions in a direction substantially parallel with a longitudinal axis of the vehicle 100. The body 110 may further include an actuator (not shown) configured to translate the ejector 130 between the retracted and extended positions. The vehicle 100 may include substantially any suitable actuator, for example, including a linear actuator such as a telescoping hydraulic piston. In certain embodiments, an electrically powered linear actuator may be preferred. A suitable electrically powered linear actuator may include, for example, an electric motor powering a rack and pinion configuration in which the panel is coupled to the rack or an electric motor powering a lead screw or ball screw. The disclosed embodiments are, of course, not limited to any particular ejector, or ejector actuation mechanism.

It will be appreciated that the ejector 130 is generally retracted towards the front of the vehicle 10 when collecting refuse into the hopper 112 via the rear loading assembly 150. For example, in the embodiments depicted on FIGS. 1 and 2, the ejector 130 may be retracted to the front of the hopper 112 (adjacent to a rear end of the cab). When the hopper 112 is full (or at any other suitable time determined by the operator), the ejector 130 may be extended toward the rear of the vehicle 100 to clear the hopper 112 and compact the refuse into the storage container 114. When the storage container 114 is full, the tailgate 120 may be opened and the ejector 130 may be fully extended to the rear of the vehicle 100 to remove the refuse from the vehicle.

With continued reference to FIGS. 1A and 1B, it will be appreciated that various ejector configurations are known in the industry and that the disclosed embodiments are not limited to any particular ejector configuration. For example, the ejector is commonly configured as a panel or blade that may be sized and shaped to extend substantially the full height and width of the storage container 114. In other embodiments, the ejector may be partial height (not extending to the roof of the storage container). Moreover, the vehicle may optionally include an auger configured to transfer refuse from the hopper 112 to the storage container 114 (e.g., through an opening in the ejector).

FIGS. 2A and 2B depict vehicle 100 including a carry can 190 deployed on the forks 160 of the rear loading assembly 150. In FIG. 2A, the rear loading assembly 150 is deployed in the engagement position (see FIG. 1A) with the carry can 190 lifted just above ground level (e.g., about 1 or 2 feet above ground level). As depicted the carry can 190 is ready to receive refuse, for example, via manual loading or via a side loading assembly 180 deployed on the carry can 190. The side loading assembly 180 may be configured to load refuse into the carry can 190 and may include substantially any suitable electrically actuated grabber mechanism (for grabbing a refuse container) and an electrically actuated arm (configured to move the grabber in and out and up and down with respect to the can 190). In FIG. 2B, the rear loading assembly 150 is deployed in the dump position with the carry can 190 turned upside down over the hopper 112 and the side loading assembly 180 fully retracted.

Figure 3:
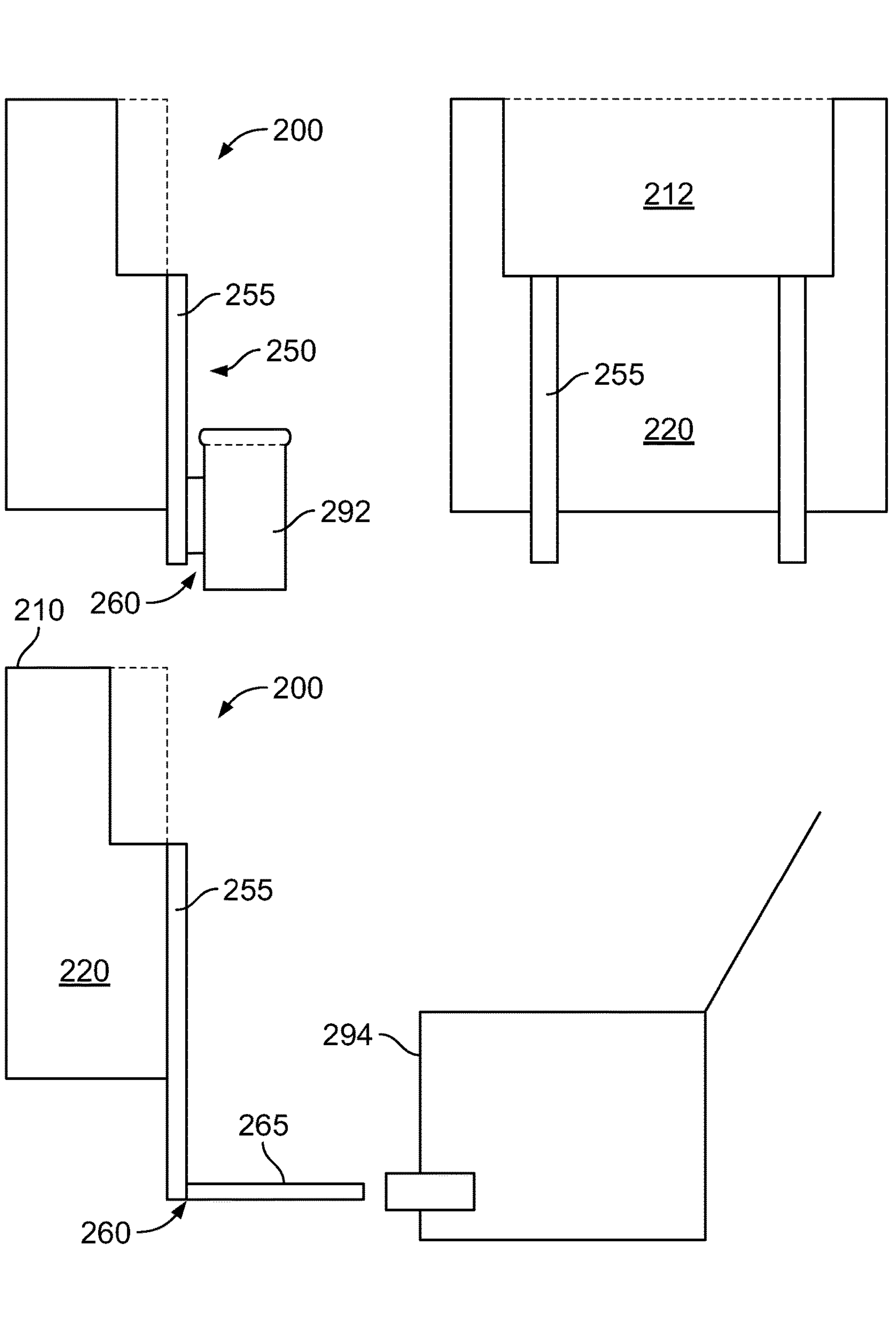
FIG. 3 depicts a refuse vehicle including a rear loading assembly deployed on the vehicle tailgate.

Turning now to FIG. 3, a refuse vehicle embodiment 200 employing another rear loading assembly 250 is depicted. Vehicle 200 is similar to vehicle 100 in that it includes a vehicle body 210 deployed on a chassis 205. The rear loading assembly 250 is deployed on the tailgate 220 on a rearward end of the body 210 and is configured to load refuse into the vehicle 200 up and over the tailgate into a hopper 212 located in the rear of the body 210 (e.g., assembly is configured to lift the refuse up and over a pivot axis of the tailgate and then dump the refuse in the hopper 212). In the depicted embodiment the assembly 250 includes a plurality of rails 255 deployed on the tailgate 220 and a container engagement assembly 260 configured to translate along the rails 255 between a lower container engagement position and an upper dump position. The container engagement assembly 260 may be configured to engage one or more containers 292 for loading refuse into the vehicle. In another embodiment assembly 260 may include a telescoping assembly configured to extend rearward from the vehicle and grab a refuse container (e.g., in a similar manner to a conventional side loading assembly). In still another embodiment the assembly 260 may further include a plurality of forks 265 configured to engage a refuse container 294 such as a dumpster. The forks 265 may be configured to rotate with respect to the assembly 260, for example, as described above with respect to FIGS. 1 and 2.

Upon engaging the container (such as container 292 or 294) it may be lifted up along the rails 255 and dumped (unloaded) into the hopper 212. For example, the container engagement assembly 260 may be configured to rotate with respect to the rails 255 and vehicle body 210 between engagement and dump positions. Such rotation may be actuated with an electrical motor and is intended to rotate an engaged container over the hopper 212 allowing the contents to be emptied therein. In other embodiments, the rails 255 may be vertically oriented at ground level (an along the tailgate 220) and then curve back over the hopper 212 at the upper end of the tailgate (i.e., the rails may have a candy cane configuration). Lifting the container along the rails tips the container over the top of the tailgate 220 allowing the contents to dump into the hopper 212.

As described above, example embodiments of vehicle 200 include a hopper 212 located in the rear of the body 210. In such embodiments, the vehicle may include distinct packing and ejecting mechanisms. For example, as described in more detail below the vehicle may include a packer that is configured to clear the hopper and pack refuse forward into the body (against an ejector). When the vehicle is full, the refuse may be unloaded via opening the tailgate and ejecting the load using an ejector that is distinct from the packer. Such an ejector may be configured similarly (or identically) to ejector 130 described above with respect to FIGS. 1 and 2.

Figure 4A:
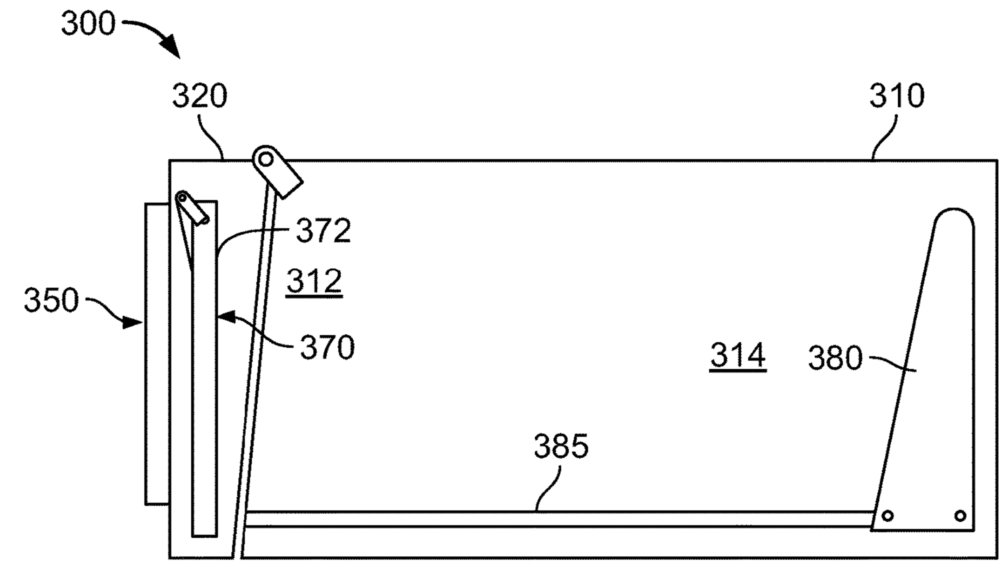
FIGS. 4A-4C (collectively FIG. 4) depict one example embodiment of a rear loading refuse vehicle including a refuse packing assembly configured to retract into the tailgate (FIGS. 4A and 4C) and extend forward into the vehicle body (FIG. 4B).
Figure 4B:
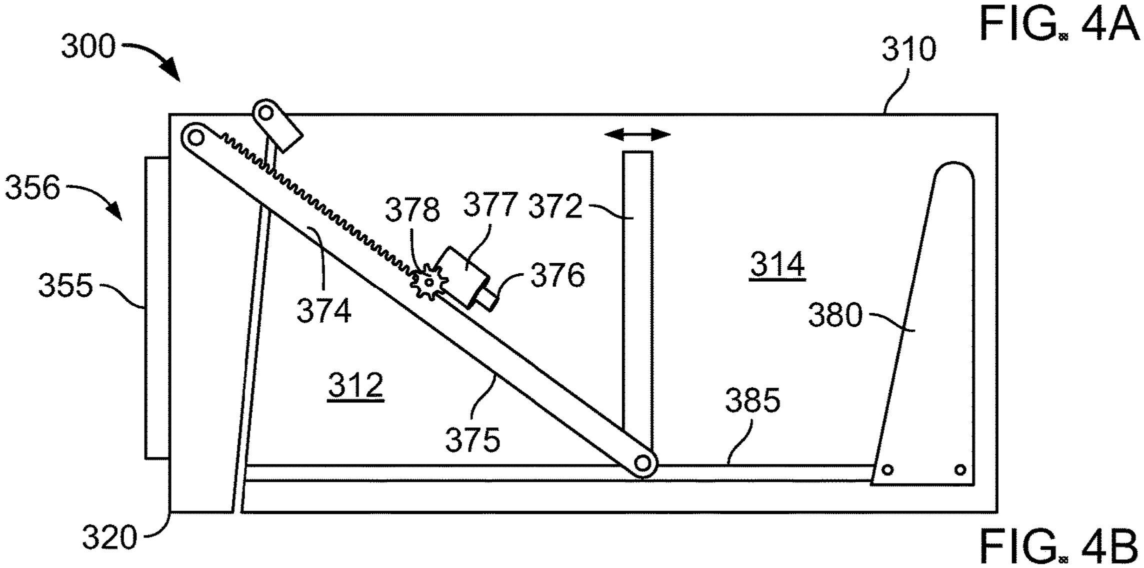
Figure 4C:
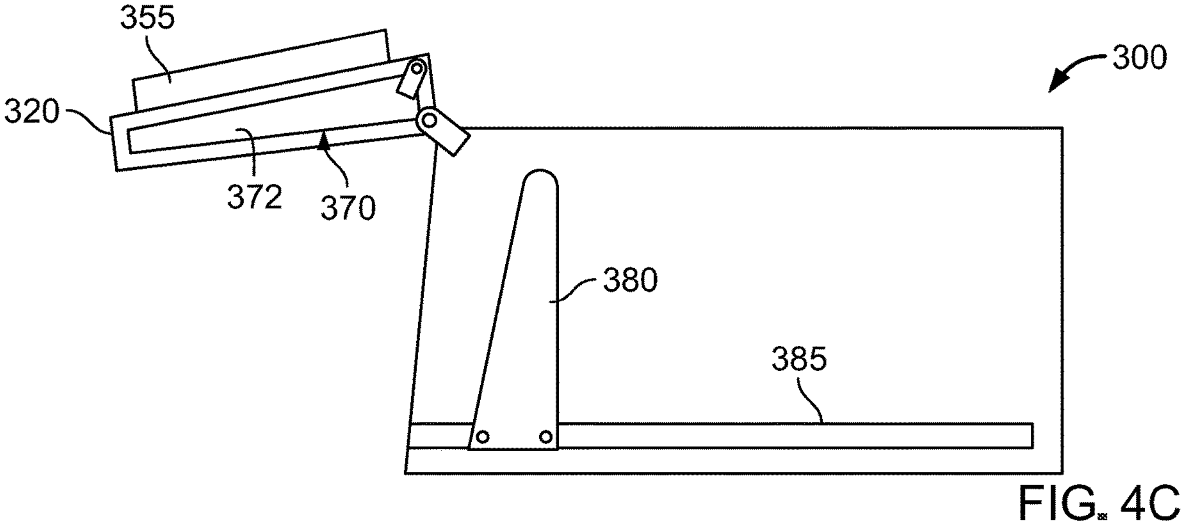

FIGS. 4A, 4B, and 4C (collectively FIG. 4) depict a side view of one example rear loading refuse vehicle 300 including distinct packer and ejector assemblies. The vehicle 300 includes a tailgate 320 deployed on a vehicle body 310. The tailgate 320 is configured to rotate open and closed as depicted on FIGS. 4A and 4C (e.g., as described above with respect to FIG. 1). A rear loading assembly 350 (e.g., including rails 355) may be deployed on the tailgate 320 (as described above with respect to rear loading assembly 250 in FIG. 3) and may be configured to rotate with the tailgate 320 upon opening (FIG. 4C). The rear loading assembly 350 is configured to load refuse up and over the tailgate 320 into a hopper 312 located in the rear of the body 310, for example, as described above.

Vehicle 300 includes a packing assembly 370 configured to extend and retract a packer panel 372 between a retracted position in the tailgate 320 (FIG. 4A) and an extended position located in the body 310 forward of the hopper 312 (FIG. 4B). The packer panel 372 is generally retracted into the tailgate 320 while collecting refuse into the hopper 312. The panel 372 may be extended forward (FIG. 4B) to clear the hopper 312 (e.g., when it is full) and compact the collected refuse into the storage container 314 located at the front of the body. After such compacting, the panel 372 is generally retracted again into the tailgate 320 while more refuse is collected into the hopper 312. This collecting and compacting of refuse may continue until the vehicle is full or otherwise ready for unloading (e.g., at the end of a route). The unloading procedure may include retracting the panel 372 into the tailgate 320 (FIG. 4A), opening the tailgate (with the rear loading assembly 350 and the packing assembly 370 including the retracted panel 372), and ejecting the load via extending the ejector 380 in the rearward direction (FIG. 4C). In such an embodiment, retracting the panel 372 and opening the tailgate moves the panel so that it doesn't obstruct the ejector during load ejection.

In the depicted embodiment, the panel 372 is extended and retracted using an electrically actuated rack and pinion arrangement. A first end of the rack 374 is rotationally coupled (pinned) to an interior structure in the tailgate 320 (e.g., at an upper internal corner as depicted). A second end of the rack 374 engages a slide 375 (or channel) which is rotationally coupled to the panel 372 (e.g., at a lower end of the panel as depicted). A motor 376, gearbox 377, and pinion 378 are deployed on the slide 375. The pinion 378 is retained in engagement with the rack 374 (e.g., as depicted on FIG. 4B) such that rotation of the pinon 378 (via the motor 376) extends and retracts the panel 372. While the disclosed embodiments are not limited in this regard, panel 372 and ejector 380 may be configured to translate (extend and retract) along a common rail (or rails) 385 located on a lower side of the body 310 (FIGS. 4B and 4C). For example, a single rail may be located along the floor of the body 310. Alternatively, first and second rails may be located along a lower portion of the body side walls. In certain embodiments the ejector 380 may be configured similarly (identically) to ejector 130 described above with respect to FIGS. 1 and 2.

Figure 5A:
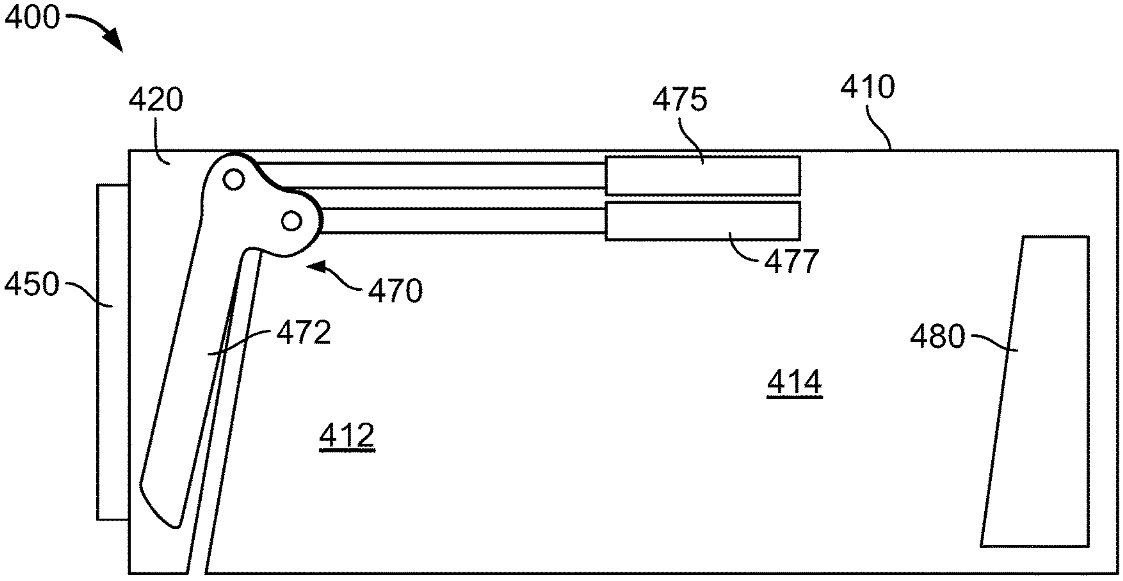
FIGS. 5A-5E (collectively FIG. 5) depict another example rear loading refuse vehicle including a refuse packing assembly configured to retract partially into the tailgate (FIGS. 5A and 5B), to extend forward into the vehicle body (FIGS. 5C and 5D), and to rotate into a position adjacent to the opened tailgate (FIG. 5E).
Figure 5B:
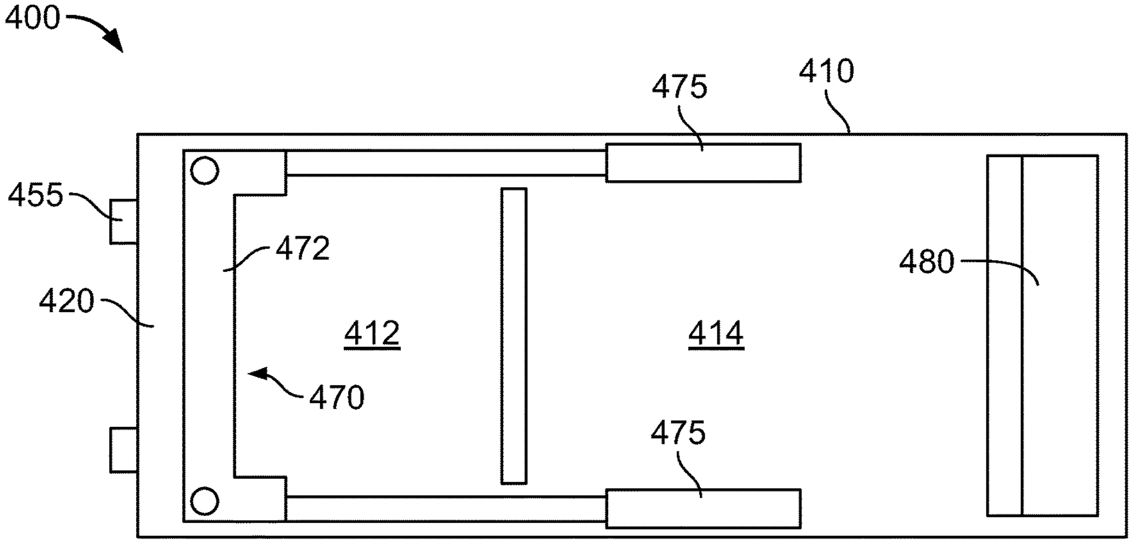
Figure 5C:
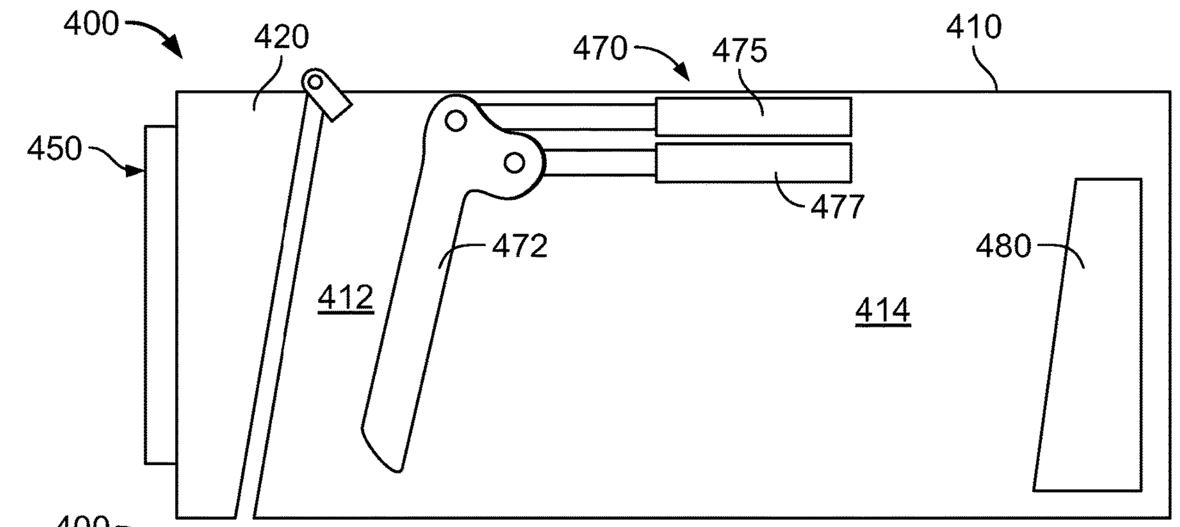
Figure 5D:
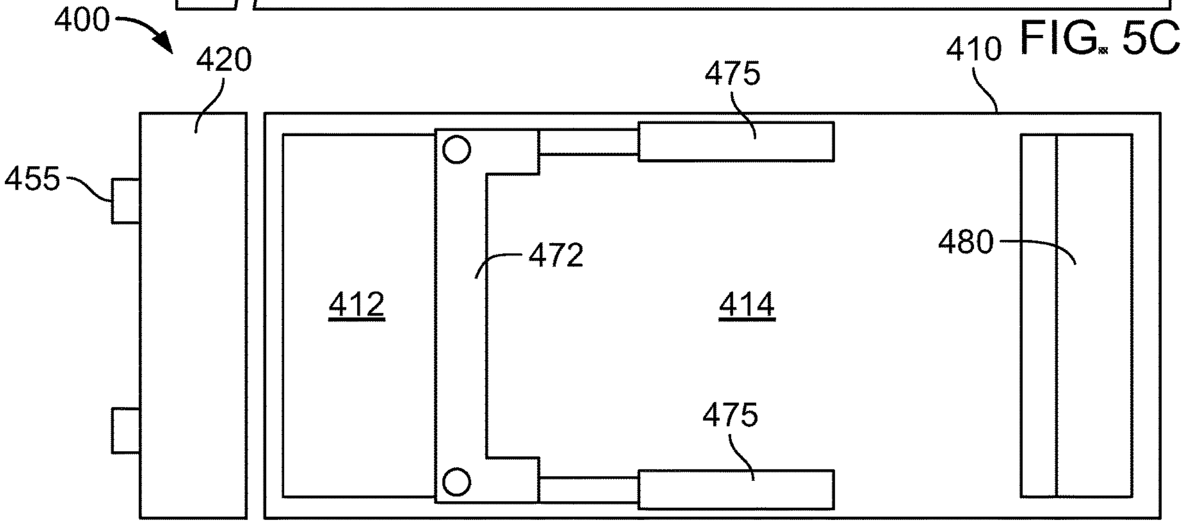
Figure 5E:
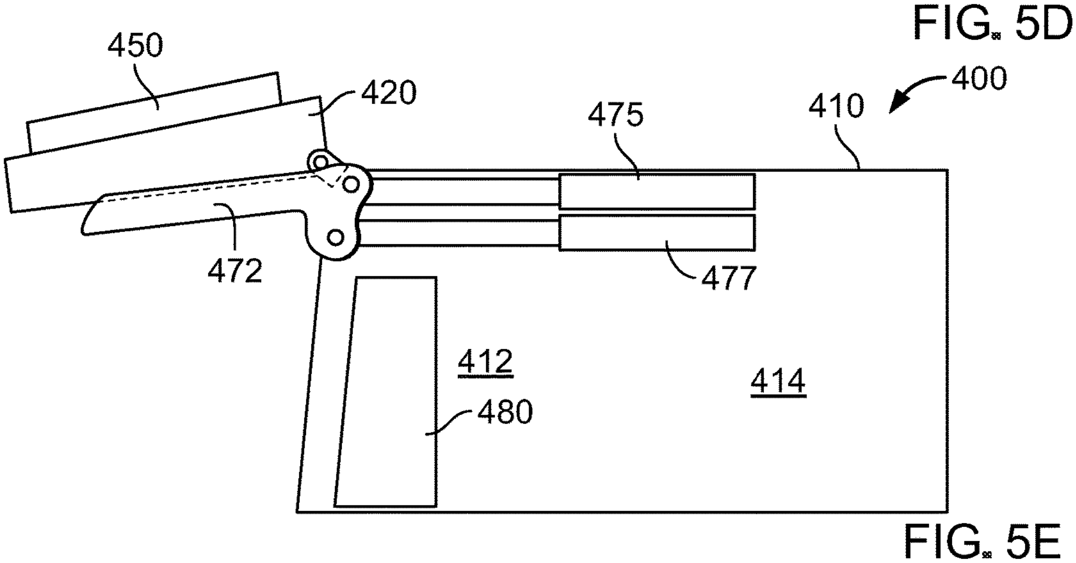

FIGS. 5A, 5B, 5C, 5D, and 5E (collectively FIG. 5) depict an alternative vehicle embodiment 400 including distinct packer and ejector assemblies. Vehicle 400 is similar to vehicles 200 and 300 in that it includes a rear loading assembly 450 deployed on the tailgate 420 and configured to load refuse up and over the tailgate 420 into a hopper 412 located rearward in the vehicle body 410. A packing assembly 470 includes a panel 472 configured to translate and rotate between a first loading position (FIGS. 5A and 5B), a second packing position (FIGS. 5C and 5D), and a third ejecting (unloading) position (FIG. 5E). The packer panel 472 is rotationally coupled (pinned) to first and second, upper and lower linear actuators 475 and 477 deployed on internal sides (left and right) of the body 410. The linear actuators (e.g., electrical actuators) 475 and 477 are configured to control the translation and rotation of the panel 472 and thereby translate and rotate the panel 472 between the first, second, and third positions. Substantially any suitable linear actuators may be employed including those described previously.

The packer panel 472 is generally located rearward of the hopper 412 in the loading position (at the rear of the body 410 adjacent or even partially internal to the tailgate 420 as depicted) with both actuators 475, 477 extended (FIGS. 5A and 5B) while the vehicle collects refuse into the hopper 412. The panel 472 may be drawn forward towards the packing position (FIGS. 5C and 5D) to clear the hopper 412 (e.g., when it is full) and compact the collected refuse into the storage container 414 via retracting the actuators 475, 477. After such compacting, the panel 472 is generally translated rearward to the loading position via extending the actuators while more refuse is collected into the hopper 412. This alternating collecting and compacting of refuse may continue until the vehicle 400 is full or otherwise ready for unloading (e.g., at the end of a route). The unloading procedure may include opening the tailgate, rotating the panel 472 into an approximately horizontal orientation adjacent to the opened tailgate and the roof of the vehicle body 410 via extending the lower actuator 477 and partially retracting the upper actuator 475. The load may then be ejected via extending the ejector 480 in the rearward direction (FIG. 5E). Note that the ejector 480 may be sized and shaped to translate below the rotated panel 472 to the rear of the body 410 for efficient load ejection. In such an embodiment, opening the tailgate and rotating the panel 472 moves the panel so that it doesn't obstruct the ejector during load ejection. It will be understood that in certain embodiments the ejector 480 may be configured similarly (identically) to ejector 130 described above with respect to FIGS. 1 and 2.

With continued reference to FIGS. 4 and 5, it will be understood that in vehicle embodiments 300 and 400, the rear loading assemblies 350 and 450 are not necessarily deployed on the tailgate as depicted. In other embodiments, the rear loading assemblies may be deployed, for example, on the vehicle body or chassis and may be configured to load refuse into a hopper located at the rear of the body. One such embodiment is not described in more detail by way of FIG. 6.

Figure 6A:
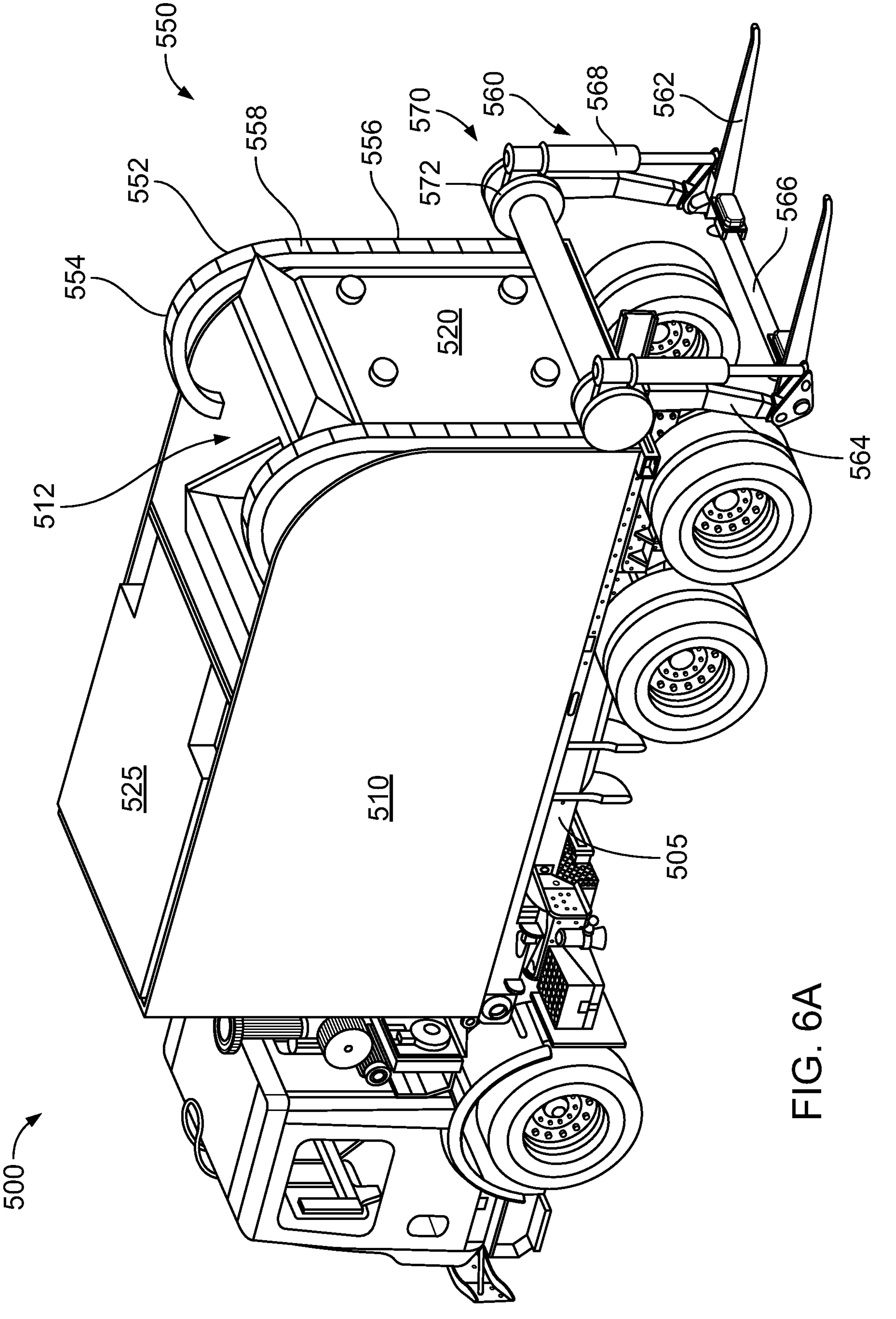
FIGS. 6A and 6B (collectively FIG. 6) depict another refuse vehicle including a rear loading assembly.
Figure 6B:
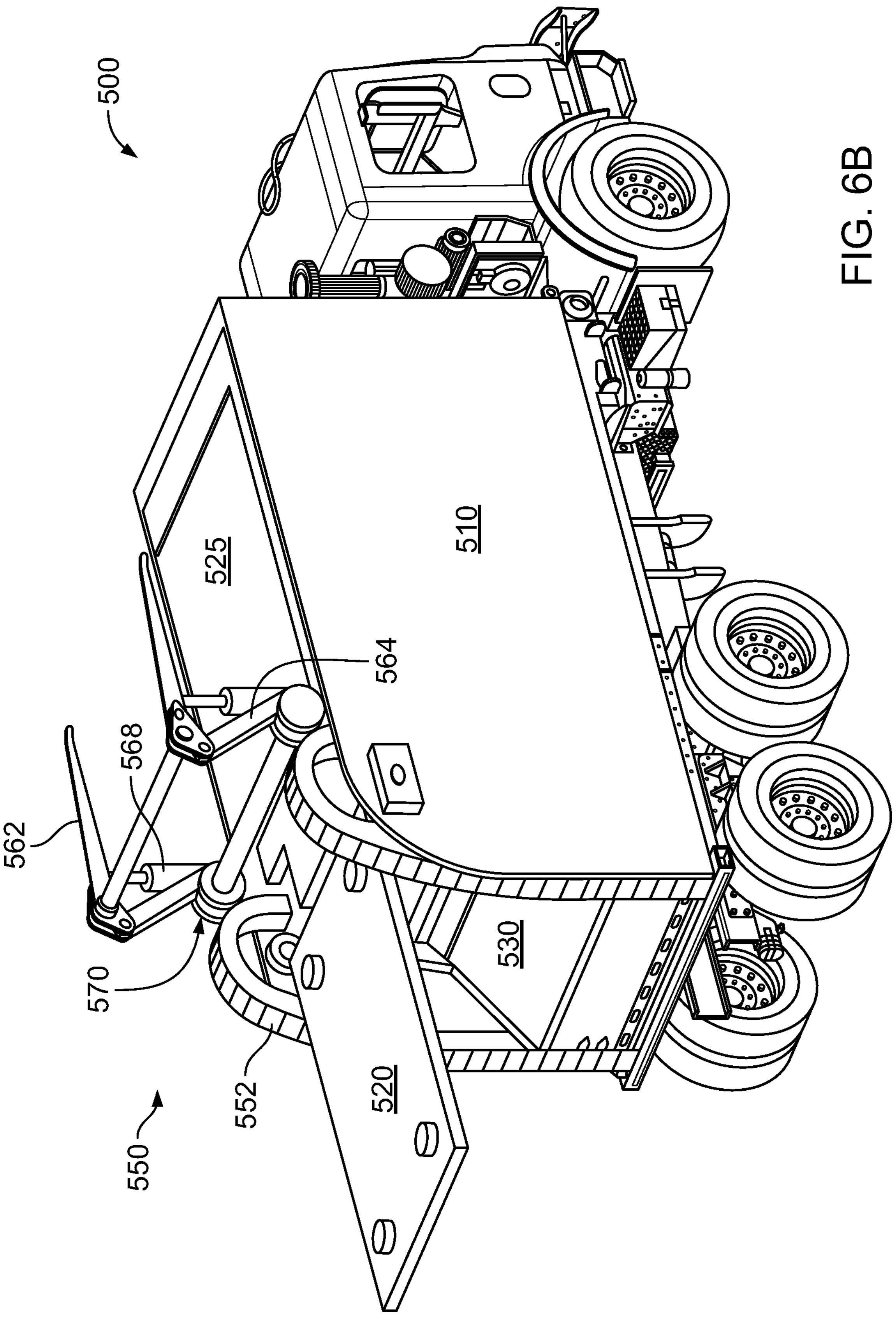

FIGS. 6A and 6B (collectively FIG. 6) depict a perspective view of another rear loading refuse vehicle 500. A vehicle body 510 includes a rear loading assembly 550 configured to load refuse into a hopper 512 from the rear of the vehicle 500. As described above with respect to FIG. 1, the rear loading assembly 550 is configured to load refuse up and over the tailgate 520 (e.g., up and over a pivot axis of the tailgate and into the hopper 512). In the depicted embodiment, the rear loading assembly 550 includes first and second candy can guide rails 552 deployed on opposing lateral sides of the body 510. The guide rails include a curved upper section 554 and a straight lower section 556. In certain embodiments each of the guide rails has a candy cane shape in which the curved section subtends an angle of greater than 90 degrees (e.g., greater than 135 degrees or about 180 degrees). The lower section 556 of the guide rails 552 may be rigidly mounted (e.g., bolted or welded) to the body 510 and/or the chassis frame 505.

In the depicted embodiment, the rear loading assembly further includes a fork assembly 560 including a pair of forks 562 rotationally coupled to a carriage 564, for example, via shaft 566. First and second fork actuators 568 may be pinned to the carriage 564 and the forks 562 and configured to rotate the forks with respect to the carriage 564 between container engagement (FIG. 6A) and dump (FIG. 6B) positions. Such rotation may also be operable to pivot or level the forks 562 during routine container engagement operations. Substantially any suitable fork actuators 568 may be employed, for example, including hydraulic pistons or linear electrical actuators. The forks 562 may be sized and shaped, for example, to engage any suitable container such as a dumpster or a carry can 190 (FIGS. 2A and 2B).

With continued reference to FIG. 6, the carriage 564 may be coupled to a rotary drive 570 that is configured to translate the carriage 564 along the guide rails 552 between lower container engagement (FIG. 6A) and upper dump (FIG. 6B) positions as depicted. The rotary drive 570 may include, for example, an electric motor (or motors) configured to rotate engagement hubs 572 about their axes. Each of the engagement hubs 572 may include, for example, a sprocket (not depicted), teeth of which are configured to engage corresponding recesses 558 in the guide rails. In such embodiments, rotation of the hubs 572 drives the coupled fork assembly 560 up and down the guide rails 552.

During vehicle operation, roof panel 525 may be translated in the forward direction as depicted on FIG. 6A to open the hopper 512. The fork assembly 560 may be translated to ground level and the forks 562 rotated to the engagement position to engage a refuse container (not shown). Upon engagement, the fork assembly 560 and the engaged container may be lifted upwards along the guide rails 552 via rotating the rotary drive 570. In such an operation, the container is lifted upwards along straight section 556 and then curls around curved section 564 thereby rotating the container with respect to the vehicle body 510. Rotation of the forks 562 to the dump position is intended to further rotate the container and enable the contents thereof to be fully emptied into the hopper 512. While not depicted, the vehicle 500 may further include a packer assembly configured to pack loaded refuse towards the front of the vehicle, for example, as described above with respect to FIGS. 4 and 5. To eject refuse from the vehicle, the fork assembly may be translated to the upper dump position and the tailgate opened (FIG. 6B), for example, as described above with respect to FIG. 1. An ejector 530 may then be translated towards the rear of the vehicle to eject the load (e.g., as described above with respect to FIGS. 1, 4, and 5).

It will be appreciated that the disclosed refuse vehicles or vehicle bodies may further include one or more rear mounted cameras (not shown in the figures) and/or other back-up assistance sensors, such as a radar sensor, configured to assist the vehicle operator during container engagement. For example, cameras and/or sensors may be deployed on a rear side of the vehicle body below the tailgate, on the vehicle chassis, on the rear loading refuse assembly components, and/or at any other suitable location on the vehicle. In desirable embodiments, one or more cameras may provide wide angled and other views of the forks and the area behind the vehicle. Camera output may be displayed on one or more monitors located in the cab for easy viewing by a vehicle operator. Vehicle camera operator display systems are well known to those of ordinary display.

Although embodiments of a rear loading refuse vehicle have been described in detail, it should be understood that various changes, substitutions and alternations can be made herein without departing from the spirit and scope of the disclosure as defined by the appended claims.

The invention claimed is:

1. A refuse vehicle comprising:
- a vehicle chassis;
- a refuse vehicle body on the vehicle chassis, the refuse vehicle body including a hopper configured to receive refuse and a storage container configured to store compacted refuse;
- a tailgate coupled to a rearward facing side of the refuse vehicle body, the tailgate movable between a closed position and an open position;
- a refuse packing assembly in the refuse vehicle body and configured to transfer refuse from the hopper and compact said refuse in the storage container, the refuse packing assembly comprising:
  - a packer panel that is linearly displaceable and electrically actuated; and
  - a rack retained in engagement with a pinion, wherein rotation of the pinion causes the packer panel to extend and retract out of and into the tailgate, and wherein an end of the rack engages at least one of a slide or a channel that is rotationally coupled with the packer panel; and
- a rear loading assembly on the refuse vehicle body, the rear loading assembly configured to (i) engage a refuse container at the rearward facing side of the refuse vehicle and (ii) lift and rotate the refuse container over the hopper such that the refuse container is unloaded into the hopper, wherein the rear loading assembly is configured to lift the refuse container over a top end of the tailgate.

2. The refuse vehicle of claim 1, wherein the rear loading assembly is deployed on an external side of the tailgate and moves with the tailgate between the open position and the closed position.

3. The refuse vehicle of claim 2, wherein the rear loading assembly comprises at least first and second rails on the tailgate, the first and second rails configured to guide a container engagement assembly and an engaged refuse container over the top end of the tailgate, and wherein the container engagement assembly is configured to rotate with respect to the first and second rails between a container engagement position and a dump position.

4. The refuse vehicle of claim 2, wherein the hopper is located between the storage container and the rearward facing side of the refuse vehicle.

5. The refuse vehicle of claim 4, wherein the packer panel is configured to clear the hopper and pack refuse in the storage container in a forward direction in the refuse vehicle body.

6. The refuse vehicle of claim 5, further comprising an ejector assembly configured to eject refuse from the refuse vehicle body in a rearward direction when the tailgate is in the open position, the ejector assembly being distinct from the refuse packing assembly.

7. The refuse vehicle of claim 5, wherein the refuse packing assembly is configured to retract into the tailgate, and wherein the refuse packing assembly is further configured to move with the tailgate as the tailgate moves between the open and closed positions.

8. The refuse vehicle of claim 5, wherein the refuse vehicle further comprises an electric motor coupled to the at least one of the slide or the channel and configured to drive the pinion.

9. The refuse vehicle of claim 1, wherein:
- the tailgate is configured to rotate about a pivot axis between the closed position and the open position; and
- the rear loading assembly is configured to lift the refuse container over the pivot axis.

10. The refuse vehicle of claim 1, wherein another end of the rack being rotationally coupled with the tailgate.

11. A refuse vehicle comprising:
- a vehicle chassis;
- a refuse vehicle body on the vehicle chassis, the refuse vehicle body including a hopper configured to receive refuse and a storage container configured to store compacted refuse;
- a tailgate coupled to a rearward facing side of the refuse vehicle body, the tailgate movable between a closed position and an open position;
- a refuse packing assembly in the refuse vehicle body and configured to transfer refuse from the hopper and compact said refuse in the storage container, wherein the refuse packing assembly comprises:
  - a packer panel configured to clear the hopper and pack refuse in the storage container in a forward direction in the refuse vehicle body; and
  - a rack retained in engagement with a pinion, wherein rotation of the pinion causes the packer panel to extend and retract out of and into the tailgate, and wherein an end of the rack engages at least one of a slide or a channel that is rotationally coupled with the packer panel; and
- a rear loading assembly on the refuse vehicle body, the rear loading assembly configured to (i) engage a refuse container at the rearward facing side of the refuse vehicle and (ii) lift and rotate the refuse container over the hopper such that the refuse container is unloaded into the hopper, wherein the rear loading assembly is configured to lift the refuse container over a top end of the tailgate.

12. The refuse vehicle of claim 11, wherein the rear loading assembly is deployed on an external side of the tailgate and moves with the tailgate between the open position and the closed position.

13. The refuse vehicle of claim 12, wherein the rear loading assembly comprises at least first and second rails on the tailgate, the first and second rails configured to guide a container engagement assembly and an engaged refuse container over the top end of the tailgate, and wherein the container engagement assembly is configured to rotate with respect to the first and second rails between a container engagement position and a dump position.

14. The refuse vehicle of claim 11, further comprising an ejector assembly configured to eject refuse from the refuse vehicle body in a rearward direction when the tailgate is in the open position, the ejector assembly being distinct from the refuse packing assembly.

15. The refuse vehicle of claim 11, wherein the packer panel is linearly displaceable.

16. The refuse vehicle of claim 11, wherein the refuse packing assembly is further configured to move with the tailgate as the tailgate moves between the open and closed positions.

17. The refuse vehicle of claim 11, wherein the refuse vehicle further comprises an electric motor coupled to the at least one of the slide or the channel and configured to drive the pinion.

18. The refuse vehicle of claim 17, wherein the refuse vehicle further comprises a gearbox coupled with the electric motor and the pinion.

19. The refuse vehicle of claim 11, wherein another end of the rack is rotationally coupled with the tailgate.

20. The refuse vehicle of claim 11, wherein the refuse packing assembly is configured to retract into the tailgate, and wherein the refuse packing assembly is further configured to move with the tailgate as the tailgate moves between the open and closed positions.

* * * * *